INVENTOR.
WILSON P. BOOTHROYD
BY Robert D. Sanborn
ATTORNEY

INVENTOR.
WILSON P. BOOTHROYD
BY Robert D Sanborn
ATTORNEY

United States Patent Office 3,109,896
Patented Nov. 5, 1963

3,109,896

RADIO RECEIVER MEANS EMPLOYING SEPARABLE COMPLEMENTARY UNITS

Wilson P. Boothroyd, Huntingdon Valley, Pa., assignor, by mesne assignments, to Philco Corporation, Philadelphia, Pa., a corporation of Delaware Filed Oct. 22, 1958, Ser. No. 768,951
6 Claims. (Cl. 179—15)

The present invention relates to radio receiver systems and more particularly to receiver systems which will receive selectively different types of amplitude modulated signals.

Amplitude modulation of a single carrier frequency with a monaural program signal is now and has been for some years the most widespread system employed in commercial broadcasting. It is the only form of commercial radio broadcasting that reaches all communities in the United States. As a result, there are a large number of amplitude modulation receivers in all sections of this country and in other parts of the world. There is also a continuing demand for new radio receivers of this type.

Systems are currently being proposed which would utilize the existing amplitude modulation broadcasting stations to provide stereophonic broadcasting facilities while maintaining the present service to owners of monaural receivers. One compatible system of stereophonic broadcasting currently being proposed can be received as a monaural signal on conventional amplitude modulation receivers with no appreciable loss of signal intelligence. In this proposed system one stereophonic program signal is modulated on a first carrier signal. The second stereophonic program signal is modulated on a second carrier signal which has the same frequency as first carrier signal but which has a phase which differs from that of the first signal by approximately a quarter cycle of the two carrier signals. The two modulated carrier signals are linearly combined to produce a resultant signal which is modulated both in amplitude and phase. This single dual-modulated carrier signal can also be represented as a resultant carrier signal of fixed amplitude which has associated therewith two pairs of sidebands, one pair representing the sidebands originally associated with the first carrier signal and the second pair representing the sidebands originally associated with said second carrier signal.

The introduction of this compatible system of stereophonic broadcasting poses certain problems for the supplier of radio receiving equipment. Monaural receivers manufactured in the future should be convertible to stereophonic receivers with maximum utilization of existing circuit components in the monaural receiver. Converter means are also required for converting both monaural receivers now in use and those which will be manufactured in the future so that single carrier, stereophonic signals may be received. For economic reasons it is desirable that stereophonic receiving systems be separable into components which can be purchased separately. At least one of the components should be usable for the monaural reproduction of amplitude modulated broadcast signals with a minimum number of idle parts. Finally, since not all amplitude modulation broadcasting stations will convert to stereophonic broadcasting and since the stations which do convert may not find it advisable to broadcast all programs stereophonically, it is essential that complete stereophonic receiver systems be capable of receiving monaural broadcast signals and reproducing these with a minimum number of idle elements, particularly audio amplifier elements and associated circuitry. All of these requirements should be met with a minimum number of different circuits so that the public can derive the benefits which flow from the mass production of a limited number of standardized items.

Therefore it is an object of the present invention to provide a stereophonic receiver system which is readily separable into at least two components, at least one of which has utility without the other.

Another object of the present invention is to provide a stereophonic receiver system which is readily separable into two components, one of which will operate separately as a receiver of monaural signals with full utilization of the parts contained therein, said two units together being usable for the reception of stereophonic or monaural broadcast signals with substantially complete utilization of all major components therein.

Another object of the present invention is to provide a monaural receiver system which may be converted for stereophonic reception without changes in the circuitry thereof and with substantially complete utilization of the major circuit components included therein.

Still another object of the present invention is to provide adapter circuits which will convert existing monaural receivers for stereophonic reception with minimum changes in circuitry.

A further object of the present invention is to provide a complete stereophonic receiver system which is readily separable into separately marketable units.

These and other objects of the present invention are achieved by providing two separable complementary units. One unit includes means for heterodyning received signals to a fixed intermediate frequency, envelope detection means and audio amplifier means. This first unit is usable interchangeably as a monaural receiver or as a component part of a stereophonic receiver. The other unit includes additional detection means and audio amplifier means and is usable interchangeably as a component part of a stereophonic receiver or as a converter unit for monaural receivers.

For a better understanding of the present invention together with other and further objects thereof, reference should now be made to the following detailed description which is to be read in conjunction with the accompanying drawings in which.

Figure 1:
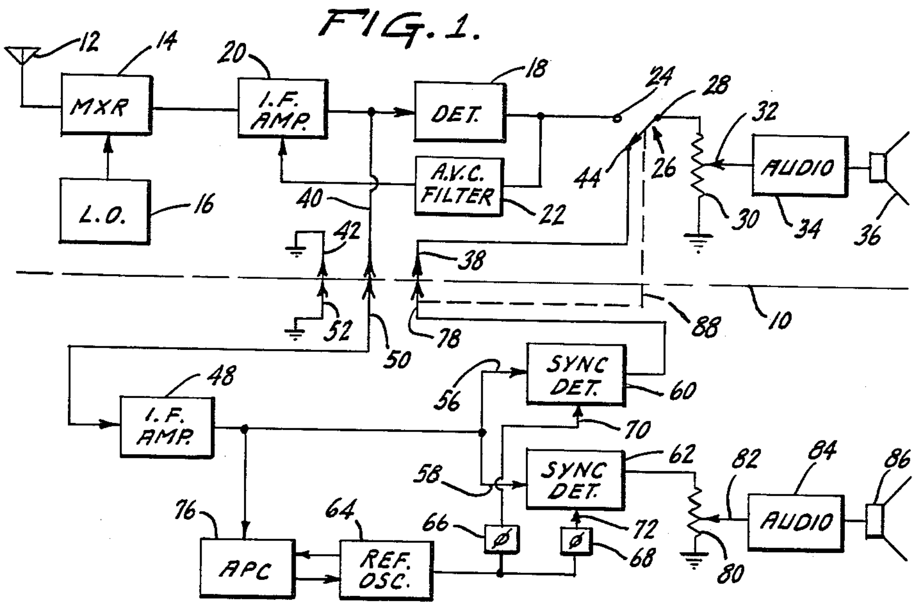
FIG. 1 is a block diagram showing a complete stereophonic receiver system formed of two separable, complementary units.

In FIG. 1, one complementary, separable unit is shown above the broken line 10. The second complementary unit is shown below line 10. These two units are preferably mounted on separate chassis and may be enclosed in separate cabinets.

The upper unit of FIG. 1 comprises an antenna 12, a mixer 14 and a local oscillator 16 for supplying a heterodyne signal to mixer 14. Local oscillator 16 may include conventional means for changing the frequency of the signal supplied thereby so as to permit the upper unit to receive signals of different carrier frequencies.

The output of mixer 14 is supplied to an envelope detector 18 through an intermediate frequency amplifier 20. The D.C. output of detector 18 is fed back to an intermediate frequency amplifier 20 through an automatic volume control filter 22.

The audio output of detector 18 is supplied to one terminal 24 of a multiposition switch 26. The fixed terminal 28 of switch 26 is connected to one terminal of an audio volume control element which is represented in FIG. 1 by volume control potentiometer 30. Potentiometer 30 is connected between terminal 28 and ground. An adjustable tap 32 on potentiometer 30 connects to the input of an audio frequency utilization device which is represented in FIG. 1 by audio amplifier 34 and speaker 36. Although a speaker 36 has been shown in FIG. 1 it is to be understood that earphones, a recording device or other utilization means may be substituted therefor.

The upper unit in FIG. 1 is provided with connectors 38, 40 and 42. Connector 42 is coupled to the signal ground of the upper unit of FIG. 1. Connector 40 is coupled to the output of intermediate frequency amplifier 20. Connector 38 is connected to a second terminal 44 on multiposition switch 26. As shown in FIG. 1, switch 26 connects point 28 to either terminal 24 or terminal 44. Connectors 38, 40 and 42 may take the form of a single jack, a plurality of binding posts, or other similar means which will facilitate the connection of the upper unit of FIG. 1 to the complementary unit shown below line 10.

The lower unit shown in FIG. 1 includes an intermediate frequency amplifier 48 which has its input at connector 50. Connector 52 is at circuit ground for the lower unit. Connectors 50 and 52 mate with connectors 40 and 42, respectively, of the upper unit. Amplifier 48 may be omitted if the signal on lead 40 is at a sufficiently high amplitude level to supply the circuits contained in the lower unit. The output of amplifier 48 is connected to inputs 56 and 58 of synchronous detectors or demodulators 60 and 62.

A reference oscillator 64 supplies a demodulating reference signal to detectors 60 and 62 by way of phase shifters 66 and 68, respectively. The function of phase shifters 66 and 68 is to establish a preselected difference in phase between the demodulating reference signals supplied to inputs 70 and 72 of detectors 60 and 62, respectively, and to provide a preselected phase relationship between the demodulating reference signals and the average carrier signal at the output of amplifier 48. Obviously this could be accomplished also by eliminating one of the phase shifters 66 and 68 and placing suitable phasing means (not shown) in the reference oscillator circuit 64.

An automatic phase control circuit 76 receives one input signal from the output of amplifier 48 and a second input signal from reference oscillator 64. Phase control circuit 76 supplies an output signal to oscillator 64 to maintain the above-mentioned preselected phase relationship between the demodulating reference signals supplied to inputs 70 and 72 and the average carrier signal appearing at the output of amplifier 48. A phase control circuit of the type required is shown in detail in FIG. 3.

The output of synchronous detector 60 is coupled to a connector 78 which mates with connector 38. The output of detector 62 is connected to a volume control circuit 80 which, in FIG. 1, takes the form of a potentiometer connected between the output of detector 62 and circuit ground. Tap 82 on potentiometer 80 connects to an audio utilization device including an amplifier 84 and a speaker 86. The audio utilization device in the lower unit of FIG. 1 is preferably similar to the audio utilization device of the upper unit.

Switch 26 may be operated manually or it may be electrically or mechanically interconnected with connectors 38, 40 and 42 and/or connectors 50, 52 and 78 so that it is in the position shown in FIG. 1 when connectors 50, 52 and 78 are mated with connectors 40, 42 and 38, respectively. This interconnection is represented by the broken line 88 in FIG. 1.

Figure 3:
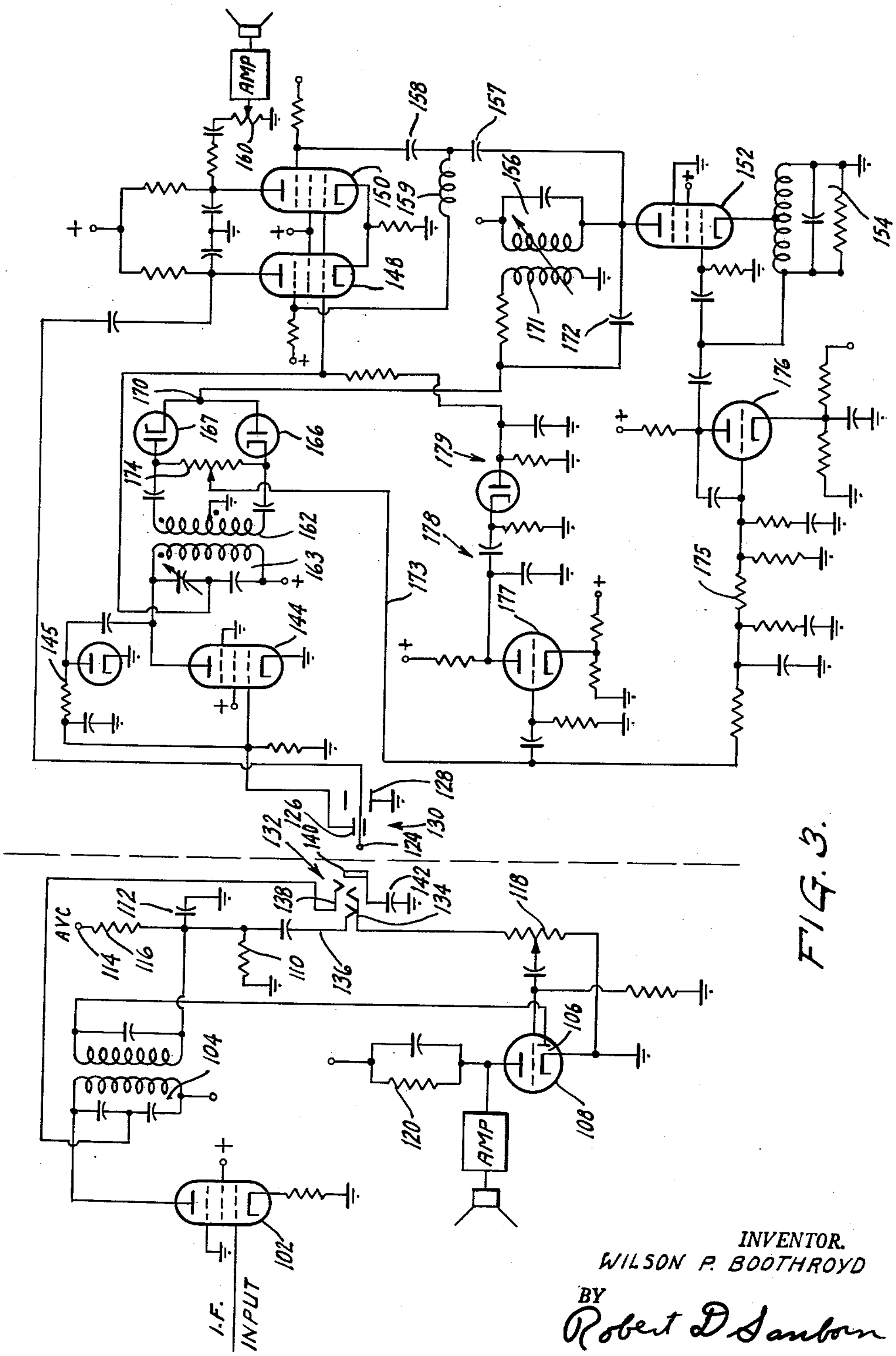
FIG. 3 is a schematic diagram of a portion of a stereophonic receiver arranged according to the block diagram of FIG. 1.

FIG. 3 shows a schematic diagram of a portion of a receiver circuit arranged in accordance with the block diagram of FIG. 1. The unit shown to the right of line 10 of FIG. 3 corresponds to the lower unit of FIG. 1 and is complete except for power supply. The unit shown to the left of line 10 in FIG. 3 represents only a portion of the intermediate frequency amplifier 20, the detector 18 and a portion of the audio frequency circuits of the upper unit of FIG. 1.

In FIG. 3, electron tube 102 and tuned load circuit 104 form an intermediate frequency amplifier stage. The secondary of load circuit 104 is connected to diode 106 in the electron tube 108. Resistor 110 and capacitor 112 from the detector load circuit for the diode 106. The detector load circuit 110—112 is connected to the automatic volume control terminal 114 through an isolating resistor 116. Potentiometer 118 corresponds to potentiometer 30 of FIG. 1. Electron tube 108 and load circuit 120 form the first stage of an audio frequency amplifier.

Connectors 78, 50 and 52 are provided in FIG. 3 by the tip 124, ring 126 and sleeve 128 connections of a coaxial plug 130. Plug 130 mates with a coaxial jack 132. The tip connection 134 of jack 132 connects to volume control potentiometer 118. The circuit between connection 134 and contact 136 is broken when plug 130 is inserted into jack 132. Thus tip connections 124 and 134 and contact 136 perform the functions of switch 26 and connectors 38 and 78 of FIG. 1. Ring connection 138 is connected to load impedance 104. Preferably the connection is made to a point of relatively low impedance and relatively low signal level since the length of the leads between the two units shown in FIG. 3 may be of the order of 4 to 12 feet in order to provide the necessary separation between speakers 36 and 86. Ring connection 140 is coupled to circuit ground. In transformerless receivers this coupling is preferably by way of bypass capacitor 142.

In FIG. 3 the intermediate frequency signal appearing on ring connection 126 is supplied to an intermediate frequency amplifier stage 144. Stage 144 is provided with a conventional automatic volume control loop 145 which eliminates any variations in signal level which may occur in the connection between the two units of FIG. 3. The amplified intermediate frequency signal is supplied to the control grids of two synchronous detector tubes 148 and 150.

The reference oscillator circuit in FIG. 3 includes tube 152, tank circuit 154 and an anode load circuit 156. The signal from the anode of tube 152 is supplied to the suppressor grid of tube 150 by way of a capacitive network 157, 158. This reference signal at the anode of tube 152 is supplied to the suppressor grid of the other synchronous detector tube 148 by way of capacitor 157 and inductor 159. The phase shift characteristics of these two paths are such that the signal at the suppressor grid of tube 150 is displaced in phase by a preselected amount from the signal at the suppressor grid of tube 148. The detected audio signals appear at the anodes of tubes 148 and 150. The anode of tube 148 is coupled to tip connection 124 on plug 130. The anode of tube 150 is connected to volume control potentiometer 160.

The phase comparator circuit of FIG. 3 comprises a center-tapped secondary winding 162 which is coupled to the anode load impedance 163 of the intermediate frequency amplifier tube 144. This phase comparator circuit also includes diode detector tubes 166 and 167. The polarity of the signal supplied by secondary winding 162 is indicated in conventional fashion by means of the dots placed adjacent to the primary and secondary windings.

The signal from the reference oscillator 152 is supplied between point 170 and ground. The coupling from the reference oscillator to the phase detector is through a variable phasing circuit comprising a secondary winding 171 coupled to the tuned anode load 156 of reference oscillator tube 152. Coupling is further provided by a capacitor 172 which connects the anode of tube 152 directly to point 170. By varying the coupling between secondary winding 171 and its associated primary winding in the load circuit 156 the resultant phase of the signals supplied to point 170 may be adjusted. The purpose of this adjustment is to place the signal supplied to the suppressor grids of tubes 148 and 150 in proper phase with respect to the carrier signal component of the intermediate frequency signal supplied to the control grids of tubes 148 and 150.

An output signal is taken from the phase comparator circuit by way of lead 173 which connects with a tap on load resistor 174. This signal is supplied through a low pass filter 175 to the input of a conventional reactance tube circuit 176. Filter 175 is preferably a multiple time constant circuit having a relatively high gain for low frequency signals and then dropping off sharply for higher frequency signals.

The circuit of FIG. 3 includes a squelch circuit for quieting the receiver during tuning. This squelch circuit comprises an amplifier 177 which is energized from lead 173. The signal from amplifier 177 is passed through a bandpass circuit 178 to a peak detector circuit 179. The output of peak detector circuit 179 is coupled to the control grids of tubes 148 and 150 as a cut-off bias signal.

Turning once again to FIG. 1, the circuit of FIG. 1 operates as follows. A single carrier, amplitude modulated stereophonic signal received by antenna 12 is heterodyned to a preselected intermediate frequency in mixer 14. Detector 18 and filter 22 function as an automatic volume control circuit to minimize the effects of fading of the incoming signal. The intermediate frequency signal from amplifier 20 is supplied by way of amplifier 48 to inputs 56 and 58 of detectors 60 and 62. This signal supplied by amplifier 20 may be represented by the resultant carrier signal 180 of FIG. 2 and the two pairs of associated sidebands 182*a*—182*b*, and 184*a*—184*b*. Sidebands 182*a* and 182*b* represent one program channel and sidebands 184*a* and 184*b* represent the other program channel. Oscillator 64 and phase shifters 66 and 68 provide synchronous demodulating signals to detectors 60 and 62 which are in phase (or in direct phase opposition) to the component carrier vectors 186 and 188. The component carrier vectors 186 and 188 are not present in the received signal but are represented by the single resultant carrier signal 180. Phase control circuit 76 servos the phase of the output signal of oscillator 64 to maintain the desired phase relationship mentioned above.

The output signal of detector 60 represents the information contained in side bands 182*a* and 182*b* and is supplied by way of the intervening volume control circuit 30 and amplifier 34 to speaker 36. The output signal of detector 62 represents the information contained in sidebands 184*a* and 184*b*. This output signal is supplied through volume control 80 and amplifier 84 to speaker 86. For a more detailed explanation of the operation of a circuit of the type shown in FIG. 1 reference should be made to the copending application of Harold B. Collins, Jr., Serial No. 768,206, filed October 20, 1958, now Patent No. 3,043,914, issued July 10, 1962.

It should be noted that all of the components shown in FIG. 1 are operative when a stereophonic program signal is being received.

The two units shown in FIG. 1 will receive a monaural, amplitude modulated signal and supply two identical signals to speakers 36 and 86. The operation of the system will be the same as for stereophonic reception and the monaural signal will be treated as a stereophonic signal providing two identical program signals. It can be demonstrated that the reproduction of a monaural program signal through two spaced speakers 36 and 86 greatly improves the subjective quality of the resultant sound. For certain program materials monaural sound reproduced by spaced speaker systems is preferable to so-called hi-fidelity systems which employ only a single speaker system.

If the lower unit of FIG. 1 is removed and switch 26 is operated to connect contact 24 to point 28, the upper unit of FIG. 1 will function as a conventional amplitude modulation broadcast receiver. Detector 18 will now perform the dual function of a detector in the automatic volume control circuit and an envelope detector supplying detected program signals to the volume control circuit 30. Again it should be noted that all circuits in the upper unit are operative.

It should now be apparent that the lower unit of FIG. 1 may be employed as an adapter unit for presently existing amplitude modulation receivers provided these receivers are modified to include switch 26 or its equivalent and connection points 38, 40 and 42 or their equivalents.

The operation of the circuit of FIG. 3 is believed to be obvious from the foregoing description of this circuit and the description of the operation of the system of FIG. 1. A detailed description of the circuit to the right of line 10 in FIG. 3 is included in the above-mentioned copending application of Collins. The circuit to the left of line 10 of FIG. 3 is conventional except for the operation of jack 32, the operation of which has been explained above.

Figures 2, 4, 5:
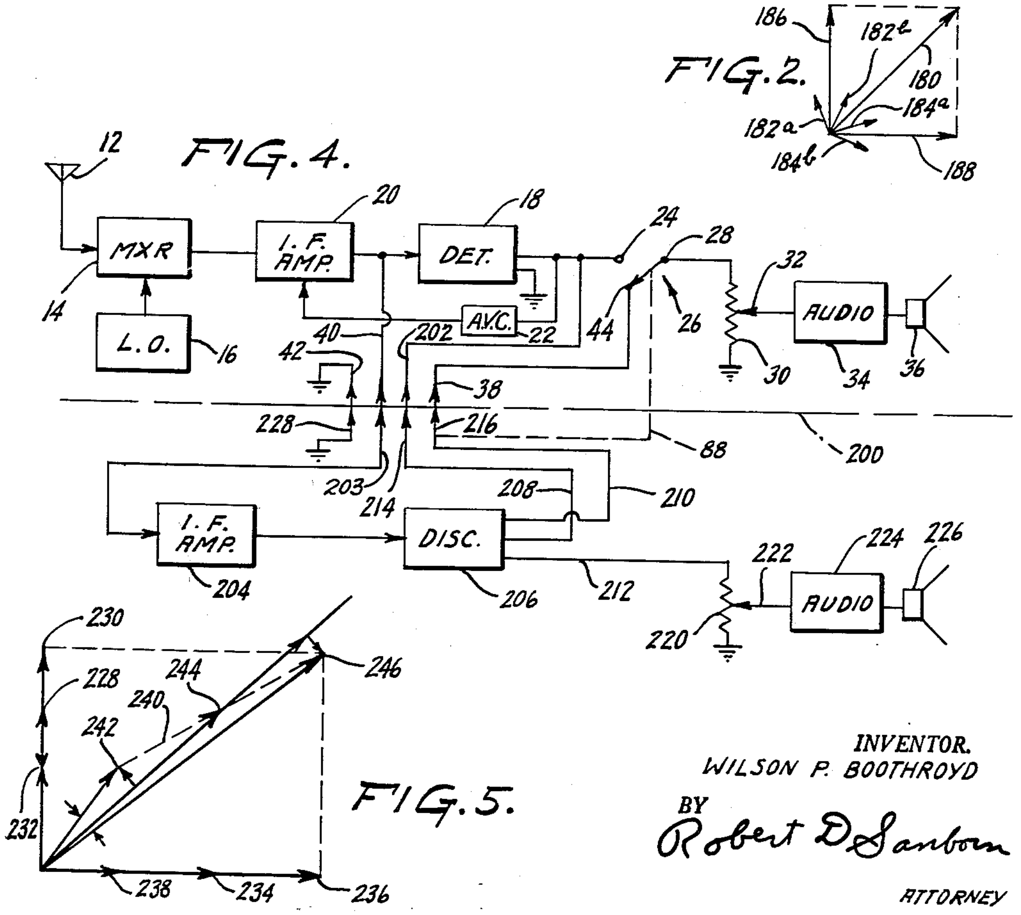
FIG. 2 is a vector diagram which is used to illustrate the operation of the system of FIG. 1.
FIG. 4 is a block diagram showing a second complete stereophonic receiver system formed of two separable, complementary units.
FIG. 5 is a vector diagram used to illustrate the operation of the circuit of FIG. 4.

The system shown in FIG. 4 again includes two complementary separable units. One complementary separable unit is shown above the line 200 and the other separable unit is shown below the line 200. The upper unit of FIG. 4 is similar to the upper unit of FIG. 1 and like parts have been identified by the same reference numerals. The upper unit of FIG. 4 includes a connector 202 which connects with the output of detector 18. This connector 202 is not included in the upper unit of FIG. 1. The lower unit of FIG. 2 comprises an intermediate frequency amplifier 204 which receives an input signal from connector 203 which mates with connector 40 of the upper unit. Amplifier 204 supplies a signal to the input of discriminator 206. Discriminator 206 is provided with a push-pull output comprising three output leads 208, 210 and 212. The common output lead 208 of the push-pull system is connected to connector 214 which mates with connector 202 of the upper unit. Output lead 210 is coupled to connector 216 which mates with connector 38 of the upper unit. Output lead 212 of discriminator 206 is connected to a volume control potentiometer 220. The tap 222 on volume control potentiometer 225 is coupled to the input of an audio frequency amplifier 224 which feeds a signal to speaker 226.

A connector 223 mates with connector 42 of the upper unit to provide continuity between the circuit ground of lower unit and the circuit ground of the upper unit.

As explained above, the single carrier, amplitude modulated, stereophonic signal can be represented as a single carrier which is modulated in amplitude and also in frequency. This illustrated in the vector diagram of FIG. 5. If one amplitude modulated signal having average value 228 is modulated so that the peak value is as shown at 230 and the minimum value is as shown at 232 is linearly combined with a second amplitude modulated signal having an average carrier amplitude as represented by vector 234 and having peaks as shown at 236 and 238, the resultant signal will be a vector whose locus lies along the line 240. This vector will vary in amplitude from a minimum amplitude at 242 through an average amplitude 244 to a maximum amplitude 246. The change in phase angle between vectors 242 and 246 is equivalent to a change in frequency since it recurs regularly on each cycle of the modulating signal. It has been shown that the signals represented by the vectors 242, 244 and 246 may be detected by detecting separately the amplitude modulation component and the frequency modulation component. The sum of the amplitude modulation signal and the frequency modulation signal will provide the information signal which is a close approximation of one stereophonic program signal and the difference between the amplitude modulation signal and the frequency modulation signal is a close approximation of the program signal for the other channel.

Turning now to the circuit of FIG. 4 it will be seen that envelope detector 18 provides a signal proportional to the amplitude modulation present on the incoming signal. Discriminator 206 provides a signal indicative of the frequency modulation present on the incoming signal. It will be seen that the portion of the output circuit of discriminator 206 between leads 208 and 210 is connected in series with the output of detector 18. This connection is such that the sum of the signals detected by detector 18 and discriminator 206 is supplied to volume control potentiometer 30. Similarly the portion of the output circuit of discriminator 206 between output leads 208 and 212 is connected in series with the output circuit of detector 18 but in the opposite polarity to the connection described above. Therefore the signal supplied to volume control potentiometer 220 will be the difference signal resulting from the subtraction of the output of discriminator 206 from the output of detector 18.

The system shown in FIG. 4 has the advantage that the lower unit has fewer parts and is less expensive to construct than the lower unit shown in FIG. 1. It has the disadvantage that the crosstalk level between the two stereophonic program channels may be slightly higher for the circuit of FIG. 4 than it is for the circuit in FIG. 1.

If a monaural amplitude modulation signal is being received, the output of discriminator 206 will be zero and the amplitude modulation signal obtained from detector 18 will be applied equally to speakers 36 and 226. If the lower unit of FIG. 4 is removed and switch 26 is operated to connect contact 24 to point 28, the upper unit of FIG. 4 will operate as a monaural amplitude modulation receiver as described above. The lower unit in FIG. 4 may be employed as an adapter for monaural radio receivers now in use by providing the suitable output connections 38, 40, 42 and 202.

The system shown in FIG. 4 may be modified to include an envelope detector in the lower unit. This envelope detector may be connected to the output of amplifier 204 and connected in circuit with discriminator 206 in place of detector 18 of the upper unit. This modification is desirable if the lower unit is to be employed as an adapter for existing monaural receivers since it minimizes the modifications which must be made in the existing receiver and insures that the signals from the envelope detector and the discriminator 206 are at the proper relative amplitude levels.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A system for receiving, selectively, different types of amplitude modulated signals, said system comprising means for receiving a radio frequency signal, means for heterodyning said received signal to a fixed intermediate frequency, said heterodyning means including intermediate frequency amplifier means, signal demodulating means coupled to the output of said heterodyning means for providing at different outputs an automatic volume control signal and first and second program signals, said demodulating means including an envelope detector coupled to the output of said heterodyning means and additional demodulating means comprising first and second synchronous detectors, the output of said first synchronous detector providing a first signal output of said additional demodulating means, the output of said second synchronous detector providing a second signal output of said additional demodulating means, a reference signal source for supplying first and second demodulating reference signals to said first and second synchronous detectors, respectively, means coupled to said reference signal source for maintaining a preselected phase relationship between said first and second demodulating reference signals and the average carrier frequency signal at the output of said heterodyning means, automatic volume control filter means connecting the output of said envelope detector to said intermediate frequency amplifier, first and second audio utilization circuits, means for connecting said first audio utilization circuit selectively to an output of said envelope detector or to said first signal output of said additional demodulating means, and means for connecting said second audio utilization circuit to said second signal output of said additional demodulating means, said means for receiving radio frequency signals, said heterodyning means, said envelope detector, said first audio utilization circuit, and said means for selectively connecting said first audio utilization means to the output of said envelope detector being readily separable from the remainder of said system and separately usable as a receiver of monaural amplitude modulated signals.

2. In combination, a pair of separate systems which may be optionally interconnected to provide, selectively, reception of monaural amplitude modulated signals and stereophonic, single-carrier, amplitude modulated signals, said first system comprising means for receiving a radio frequency signal, means for heterodyning said received signal to a fixed intermediate frequency, detector means coupled to the output of said heterodyning means, an audio utilization circuit, a first signal lead, means for connecting the input of said audio utilization circuit, selectively, to the output of said detector means or to said first signal lead, said second system comprising means for deriving a signal at the intermediate frequency from said heterodyning means in said first system, means for synchronously demodulating said derived intermediate signals, said demodulating means providing separate audio frequency signals at first and second outputs, a second audio frequency signal utilization circuit connected to said first output of said demodulating means and means for connecting said second output to said first signal lead in said first system.

3. A dual chassis system for receiving, selectively, different types of amplitude modulated signals, said system comprising means on a first chassis for receiving radio frequency signals, means on said first chassis for heterodyning said received signals to a fixed intermediate frequency, signal demodulating means coupled to the output of said heterodyning means for providing at different outputs first and second program signals, said signal demodulating means including an envelope detector disposed on said first chassis and coupled to the output of said heterodyning means, said signal demodulating means further including at least one additional demodulating means disposed on said second chassis, a first audio signal utilization circuit associated with said first chassis, a second audio signal utilization circuit associated with such second chassis, means coupling an output of said additional demodulating means on said second chassis to an input of said second audio signal utilization circuit, cable means separably connecting said two chassis, means including said cable means for connecting said first audio signal utilization circuit, selectively, to an output of said envelope detector or an output of said additional demodulating means, said cable means further providing a connection from the output of said heterodyning means to the input of said additional demodulating means.

4. A dual chassis system for receiving, selectively, different types of amplitude modulated signals, said system comprising means on a first chassis for receiving radio frequency signals, means on said first chassis for heterodyning said received signals to a fixed intermediate frequency, envelope detector means disposed on said first chassis and coupled to the output of said heterodyning means, a first audio signal utilization circuit associated with said first chassis, a frequency discriminator disposed on a second chassis said frequency discriminator having a push-pull output circuit which includes a common connection and second and third additional connections, cable means connecting said second chassis to said first chassis, said cable means providing a connection from the output of said heterodyning means to the input of said discriminator and a connection from the output of said envelope detector to said common connection of said discriminator, means including said cable means for connecting the input of said first audio signal utilization circuit, selectively, to the output of said envelope detector or to said second additional connection, second audio signal utilization circuit associated with said second chassis and means coupling said third additional connection of said discriminator to the input of said second audio signal utilization circuit.

5. A dual chassis system for receiving, selectively, different types of amplitude modulated signals, said system comprising means on a first chassis for receiving radio frequency signals, means on said first chassis for heterodyning said received signals to a fixed intermediate frequency, signal demodulating means coupled to the output of said heterodyning means for providing at different outputs first and second program signals, said signal demodulating means including an envelope detector disposed on said first chassis and coupled to the output of said heterodyning means, said signal demodulating means further including first and second synchronous demodulators disposed on said second chassis, a first audio signal utilization circuit associated with said first chassis, a second audio signal utilization circuit associated with said second chassis, means coupling the output of said second synchronous demodulator on said second chassis to an input of said second audio signal utilization circuit, cable means separably connecting said two chassis, means including said cable means for connecting said first audio signal utilization circuit selectively to an output of said envelope detector or an output of said first synchronous demodulator, said cable means further providing a connection from the output of said heterodyning means to the input of said first and second synchronous demodulators.

6. A system for receiving, selectively, different types of amplitude modulated signals, said system comprising means for receiving a radio frequency signal, means for heterodyning said received signal to a fixed intermediate frequency, said heterodyning means including intermediate frequency amplifier means, signal demodulating means for providing at different outputs an automatic means coupled to the output of said heterodyning volume control signal and first and second program signals, said demodulating means including an envelope detector coupled to the output of said heterodyning means and a frequency discriminator having a push-pull output circuit, said push-pull output circuit comprising a common connection and second and third additional connections, the output circuit of said envelope detector comprising first and second output terminals coupled to said common connection and to signal ground, respectively, said second and third additional connections providing first and second signal outputs of said frequency discriminator, automatic volume control filter means connecting the output of said envelope detector to said intermediate frequency amplifier, first and second audio utilization circuits, means for connecting said first audio utilization circuit selectively to said first output terminal of said envelope detector or said first signal ouput of said frequency discriminator, and means for connecting said second audio utilization circuit to said second signal output of said frequency discriminator, said means for receiving radio frequency signals, said heterodyning means, said envelope detector, said first audio utilization circuit, and said means for selectively connecting said first audio utilization circuit to the output of said envelope detector being readily separable from the remainder of said system and separately usable as a receiver of monaural amplitude modulated signals.

References Cited in the file of this patent

UNITED STATES PATENTS

| | | |
|---|---|---|
| 2,256,317 | Earp | Sept. 16, 1941 |
| 2,261,628 | Lovell | Nov. 4, 1941 |
| 2,491,918 | De Boer et al. | Dec. 20, 1949 |
| 2,514,246 | Knox | July 4, 1950 |
| 2,611,036 | Norgaard | Sept. 16, 1952 |
| 2,698,379 | Boelens et al. | Dec. 28, 1954 |
| 2,776,429 | Olerud | Jan. 1, 1957 |